3,024,085
PROCESS FOR THE PRODUCTION OF ANHYDROUS BORON COMPOUNDS CONTAINING ACTIVE OXYGEN
Valentin Habernickel, Bergheim (Sieg), and Friedrich Weldes, Dusseldorf-Benrath, Germany, assignors to Henkel & Cie, G.m.b.H., Dusseldorf-Holthausen, Germany
No Drawing. Filed Jan. 28, 1959, Ser. No. 789,483
Claims priority, application Germany Feb. 22, 1958
8 Claims. (Cl. 23—59)

This invention relates to a process of manufacturing novel stable anhydrous boron compounds containing active oxygen.

It has been found that new anhydrous boron compounds containing active oxygen can be made by reaction of boric acid, hydrogen peroxide of at least 30 percent concentration and ammonia in molar proportions of 1:2–6:1.05–4. (All percentages named in this specification refer to percent by weight.) The ammonia can be added in several different ways, i.e., in form of an aqueous solution, preferably a concentrated solution, or as gas, after mixing of the two other components.

It also has been found that a hitherto unknown anhydrous ammonium metaborate diperhydrate of the formula $NH_4BO_2 \cdot 2H_2O_2$ is obtained if the ammonia is added as an aqueous solution. In carrying out the process for producing this reaction product, it is indicated to work at low temperatures, i.e., between 0 and 30° C., and preferably between 10 and 25°. This has the effect that the reaction proceeds practically without loss of hydrogen peroxide especially since the liquor, after separation of the crystallizate, may be used for a new batch. It also is advantageous to use a molar ratio of $H_3BO_3$ to $H_2O_2$ of 1:3–5, i.e., to employ a considerable excess of hydrogen peroxide. Furthermore, the use of concentrated ammonia solutions is preferable. By concentrated ammonia solutions, we mean solutions having an optimum saturation limit at 0° C.

When, e.g., 40% $H_2O_2$ are employed, at temperatures up to 25° C. only approximately five parts of boric acid, which preferably is added in powder form, dissolve in 100 parts $H_2O_2$ so that the main part remains undissolved on the bottom of the solution. If this remainder is agitated strongly, and to the suspension thus formed, under continued agitation, concentrated ammonia is added up to the point of equivalence, the entire amount of boric acid dissolves and a clear solution is obtained. This denotes that only such an amount of ammonia solution is added as corresponds to a ratio of $NH_3:H_3BO_3$ of 1:1. Upon addition of more ammonia, the diperhydrate separates in well-crystallized form and in nearly quantitative yield. Recrystallization usually is not required. If traces of moisture remain on the product, they may be removed by vacuum-drying at 30–50° C. The liquor remaining after separation of the crystals may be used for a new batch, as mentioned above.

The anhydrous metaborate diperhydrate thus obtained is colorless, stable up to approximately 120° C. and can be stored. It has a comparatively high hydrogen peroxide content of approximately 53 percent. The pH value of a 1% solution at 20° C. is approximately 9.

It furthermore has been found that a boron compound containing active oxygen of the formula $NH_4BO_2 \cdot 2H_2O_2$ is obtained if, instead of an aqueous ammonia solution, gaseous ammonia is introduced in a mixture of boric acid and hydrogen peroxide in the molar proportions mentioned above. In the preparation of this product it also is advantageous to work at low temperatures as in the product described above, i.e., between 0 and 30° C., and preferably between 10 and 25°. As stated, the concentration of the hydrogen peroxide should be at least 30 percent. Preferably, solutions are employed whose concentration is between 40 and 70 percent. Moreover, the amount of hydrogen peroxide used should be chosen so that 2 mols $H_2O_2$ are applied to each mol boric acid. A preferred molar ratio is $H_3BO_3:H_2O_2$ of 1:3–5.

If hydrogen peroxide were used whose concentration is substantially below 30%, usually poorly filterable products of a composition $2NH_4BO_2 \cdot H_2O_2$ are derived, i.e., pure perhydrates whose active oxygen content is only 10.2 percent. The same results are obtained if less than 2 mols $H_2O_2$ are used per mol of boric acid, i.e., if the minimum mol ratio of 1:2 for $H_3BO_3:H_2O_2$ is not observed The first step in the process according to the present invention is the preparation of a mixture of the hydrogen peroxide solution with boric acid. This preferably is accomplished by adding the acid under agitation in the peroxide solution. If, for instance, a $H_2O_2$ solution of 40 percent concentration is employed and the molar ratios of 3–5:1 of $H_2O_2:H_3BO_3$ are maintained, only approximately 20 percent of the boric acid goes into solution at temperatures up to 25° C. whereas the remainder, if most finely divided boric acid is used, lies on the bottom of the vessel as a suspension. Into this mixture gaseous ammonia is introduced, preferably with agitation. This introduction may, for instance, be carried out in such a manner that the gas enters at the bottom of a vertical reaction tube which can be cooled and rises through the $H_2O_2$-boric acid mixture the entire length of the tube. As the reaction which is exothermic proceeds, the boric acid goes into solution while simultaneously, after exceeding a minimum concentration, the ammonium perborate diperhydrate crystallizes. This occurs at that moment when the molar ratio of ammonia to dissolved boric acid reaches the value 1:1.

The process also lends itself to continuous operation. This may be accomplished either by constant removal of the precipitated perborate from the reaction mixture or by working in a system consisting of two or more reaction tubes. In the latter case, the saturation of the

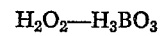
$$H_2O_2—H_3BO_3$$

solution with $NH_3$ is carried out in the first tube at temperatures not below 20° C. In the second step, the mixture passes a cooled zone wherein the perborate precipitates at 0–10°. The crystals can be separated from the liquor in a known manner, e.g., by filtration or centrifuging. The liquor itself is enriched again with $H_2O_2$ of a concentration above 40%, boric acid is added, and the mixture again is introduced into the reaction tube at 15–25° C. The perborate thus obtained is of great purity and, for most purposes, requires no recrystallization. If traces of moisture adhere to the crystals, they can be removed by vacuum drying at low temperatures.

Although the product exhibits good storability, when dry, stabilizers such as magnesium silicate, pyrophosphate, oxyquinolin, etc., may be added to the starting solution of $H_2O_2$ and boric acid.

The anhydrous ammonium perborate diperhydrate thus obtained is colorless, storable and stable up to approximately 120° C. It has a comparatively high content of total active oxygen which is composed of the peroxygen and the perhydrate oxygen and is approximately 33 percent.

The novel compounds described above are eminently suited for the production of bleaching baths and can be used for washing, cleansing and dispersing agents by themselves or in combination with other materials, such as alkalis, wash-active substances, phosphates, silicates, etc.

3

The present invention now will be further illustrated by means of the following examples. However, it should be understood that these are given merely by way of explanation, not of limitation, and that numerous changes may be made in the details without departing from the spirit and the scope of the invention as hereinafter claimed.

*Example 1*

To a mixture of 600 parts boric acid with 2,000 parts $H_2O_2$ (concn. 40%), 450 parts of a 25% aqueous ammonia solution are added under strong agitation. Care is being taken during the addition that the temperature does not exceed 25° C. The clear solution is cooled to 5–10°, and another 100 parts of ammonia solution are added. The precipitated ammonium metaborate diperhydrate is filtered by suction, washed with a small quantity of dilute ammonia solution and dried in vacuo at 40° C.

The content of $H_2O_2$ and ammonia of the remaining liquor is established and adjusted to the initial concentration. The liquor thus adjusted is reused for a new charge. The regeneration of the liquor advantageously is carried out with 60–70% $H_2O_2$.

The ammonium metaborate diperhydrate thus obtained is suitable as a bleaching agent mixed with the customary wetting agents and with known inorganic substances used for cleaning purposes, particularly for heavy duty washing agents.

An especially effective heavy duty washing agent, for instance, has the following composition:

| Ingredient: | Percent |
| --- | --- |
| Fatty alcohol sulfate | 15 |
| Alkyl benzene sulfonate | 10 |
| Waterglass ($SiO_2:Na_2O=3.5:1$) | 2 |
| Magnesium sulfate | 3 |
| Fatty acid ethanolamide | 2 |
| Sodium chloride | 3 |
| Tripolyphosphate | 15 |
| Pyrophosphate | 10 |
| Sodium sulfate | 25 |
| Ammonium metaborate diperhydrate | 3 |
| Optical bleach | 0.1 |
| Water | Balance |

If desired, a dye can be added to this washing agent to color the entire composition. The product is used in a concentration of 6–8 g./l. Due to the high $H_2O_2$ content it is possible to attain the desired bleaching action with as little as 3 percent, calculated on the washing composition, in contrast to the use of normal sodium perborate. If desired, other valuable wash-active substances can be employed in increased quantities. Such washing agents are manufactured preferably by spray-drying and in spherical shape. However, it is advantageous to add the ammonium perborate to the finished spray product.

*Example 2*

600 parts by weight of powdered boric acid are added under agitation to 2,500 parts of 40% $H_2O_2$ (molar ratio $H_2O_2:H_3BO_3$ approximately 3:1). In this operation, the boric acid dissolves only partially. The preparation of this suspension is carried out in a vertical reaction tube provided with a cooling jacket which, on its bottom, has a device for the introduction of gaseous ammonia. Through this device then the gaseous ammonia is slowly led into the suspension while the temperature is regulated by cooling at 0–10° C. During this process, the still undissolved boric acid goes into solution. As soon as the solution has attained a ratio of ammonia to dissolved boric acid of 1:1, the ammonium perborate diperhydrate of the formula $NH_4BO_3 \cdot 2H_2O_2$ separates as a crystalline deposit on the bottom. This is filtered off by suction, washed with a small quantity of alcohol and freed from residual moisture by vacuum drying at 30° C.

Approximately 1,000 parts of ammonium perborate diperhydrate are thus obtained. The total active oxygen content of this compound amounts to 32% which is composed of 21% oxygen from $H_2O_2$ and 11% perborate oxygen.

The remaining liquor is adjusted to the required initial concentration and is used again for a new batch.

The ammonium perborate diperhydrate thus obtained is suited, in combination with the customary wetting agents, as a mild-acting washing, bleaching and cleansing agent due to its true peroxygen content. It is applicable especially to sensitive fibers. In contrast to normal sodium perborate whose peroxygen is liberated only above 80° C. the ammonium perborate diperhydrate according to the present invention delivers the required active oxygen at as low a temperature as approximately 60°. This enables washing and bleaching of fibers at 60° which cannot be exposed to higher temperatures.

A washing agent of mild action has, for instance, the following composition:

| Ingredient: | Percent |
| --- | --- |
| $C_{12}$–$C_{18}$ fatty alcohol sulfate | 25 |
| Tetrapropyl benzene sulfonate | 20 |
| Fatty acid ethanolamide | 2 |
| Fatty acid amide | 2 |
| Sodium chloride | 1 |
| Sodium sulfate | 40 |
| Ammonium perborate diperhydrate | 5 |
| Magnesium silicate | 3 |
| Optical bleach | 0.1 |
| Water | Balance |

Such a cleansing mixture can be colored by the addition of suitable dyes if desired. The concentration on application of the agent is approximately 5–7 g./l.

We claim as our invention:

1. A process for the production of anhydrous boron compounds containing active oxygen, which comprises reacting boric acid, hydrogen peroxide of at least 30 percent concentration by weight, and ammonia in a molar ratio of 1:2–6:1.05–4, separating the precipitate formed and drying the same.

2. The process according to claim 7, wherein said ammonia is added to the other components, after mixing of the same, in aqueous solution.

3. The process according to claim 7, wherein said ammonia is added to the other components, after mixing of the same, as a gas.

4. The process according to claim 7, wherein the reaction is carried out using hydrogen peroxide of 40 to 70 percent concentration and at temperatures between 0 and 30° C.

5. As a new compound, ammonium perborate diperhydrate of the formula $NH_4BO_3 \cdot 2H_2O_2$, obtained by agitating boric acid with hydrogen peroxide of at least 30 percent concentration in a ratio of $H_3BO_3$ to $H_2O_2$ of approximately 1:3.5 at temperatures of 0° C. to 30° C., adding thereto, at the same temperatures and with continued agitation, gaseous ammonia in a ratio of $H_3BO_3:NH_3$ of 1:1.05, precipitating the $NH_4BO_3 \cdot 2H_2O_2$ thus formed by adding additional $NH_3$, separating and drying the precipitate.

6. As a new compound, ammonium metaborate diperhydrate of the formula $NH_4BO_2 \cdot 2H_2O_2$, obtained by agitating boric acid with hydrogen peroxide of at least 30 percent concentration in a ratio of $H_3BO_3$ to $H_2O_2$ of approximately 1:3.5 at temperatures of 0° C. to 30° C., adding thereto, at the same temperatures and with continued agitation, a concentrated aqueous ammonia solution in a ratio of $H_3BO_3:NH_3$ of 1:1.05, precipitating the $NH_4BO_2 \cdot 2H_2O_2$ thus formed by adding additional $NH_3$-solution, separating and drying the precipitate.

7. A process for the production of anhydrous boron compounds having a total active oxygen content of approximately 33 percent, which comprises reacting boric acid, hydrogen peroxide of at least 30 percent concentration by weight, and ammonia in a molar ratio of 1:2–6:1.05–4 at a temperature of 0–30° C., separating the precipitate formed and drying the same.

8. A process for the production of anhydrous boron compounds having a total active oxygen content of approximately 33 percent, which comprises stirring boric acid into hydrogen peroxide of at least 30 percent concentration by weight in molar ratios of 1:2–6; adding thereto ammonia in a molar ratio, calculated on said boric acid, of 1:1.05–4 at a temperature of 0–30° C., and separating the precipitate formed and drying the same to obtain an anhydrous boron compound.

References Cited in the file of this patent

UNITED STATES PATENTS

| | | |
|---|---|---|
| 1,929,121 | Seng | Oct. 3, 1933 |
| 2,761,759 | Van Gelder | Sept. 4, 1956 |
| 2,851,334 | Bretschneider | Sept. 9, 1958 |
| 2,937,998 | Habernickel | May 24, 1960 |

OTHER REFERENCES

Hoffman: "Lexicon der Anorganischen Verbindungen," Band 1, 2 Halfte (1919), page 1629.

Ephraim's, "Inorganic Chemistry," 4th Ed., revised, pages 239 and 242. Nordeman Pub. Co., Inc., N.Y.